US010743061B2

(12) United States Patent
Choi

(10) Patent No.: US 10,743,061 B2
(45) Date of Patent: Aug. 11, 2020

(54) DISPLAY APPARATUS AND CONTROL METHOD THEREOF

(71) Applicant: SAMSUNG ELECTRONICS CO., LTD., Suwon-si (KR)

(72) Inventor: Changil Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/298,519

(22) Filed: Mar. 11, 2019

(65) Prior Publication Data

US 2019/0289360 A1    Sep. 19, 2019

(30) Foreign Application Priority Data

Mar. 13, 2018   (KR) ........................ 10-2018-0029109

(51) Int. Cl.
*G06F 3/0484* (2013.01)
*H04N 21/44* (2011.01)
(Continued)

(52) U.S. Cl.
CPC ........... *H04N 21/44* (2013.01); *G06F 3/0484* (2013.01); *G06F 3/165* (2013.01);
(Continued)

(58) Field of Classification Search
CPC .............................. H04N 21/44; G06F 3/0484
See application file for complete search history.

(56) References Cited

U.S. PATENT DOCUMENTS

| 2010/0303296 A1* | 12/2010 | Hattori | ................... | H04N 19/15 |
| | | | | 382/103 |
| 2014/0254689 A1* | 9/2014 | Ho | ....................... | H04N 19/196 |
| | | | | 375/240.26 |

(Continued)

FOREIGN PATENT DOCUMENTS

| KR | 10-2012-0006115 A | 1/2012 |
| KR | 20120006115 A * | 1/2012 |

(Continued)

OTHER PUBLICATIONS

International Search Report and Written Opinion dated Jun. 25, 2019 issued by the International Searching Authority in counterpart International Application No. PCT/KR2019/002899 (PCT/ISA/210 and PCT/ISA/237).

(Continued)

*Primary Examiner* — Rowina J Cattungal
(74) *Attorney, Agent, or Firm* — Sughrue Mion, PLLC

(57) ABSTRACT

A display apparatus and a control method of the display apparatus are provided. The display apparatus includes a display, a communicator that communicate with a server, a sensor that obtains information about a companion animal and a processor that controls the display to display content based on a first image quality value, transmits the information about the companion animal to the server, receives, from the server, a second image quality value based on the information about the companion animal, and controls the display to display the content based on the received second image quality value. The information is obtained by the sensor while the content is displayed based on the first image quality value.

21 Claims, 14 Drawing Sheets

(51) Int. Cl.
*G06F 9/30* (2018.01)
*H04N 21/266* (2011.01)
*G06F 3/16* (2006.01)
*H04N 21/4223* (2011.01)
*H04N 21/25* (2011.01)
*H04N 21/422* (2011.01)

(52) U.S. Cl.
CPC ....... *G06F 9/30043* (2013.01); *H04N 21/251* (2013.01); *H04N 21/266* (2013.01); *H04N 21/4223* (2013.01); *H04N 21/42203* (2013.01)

(56) References Cited

U.S. PATENT DOCUMENTS

2015/0319468 A1    11/2015  Park et al.
2017/0311863 A1*  11/2017  Matsunaga .............. A61B 5/16

FOREIGN PATENT DOCUMENTS

| KR | 10-2014-0104653 A | | 8/2014 |
| KR | 20140104653 A | * | 8/2014 |
| KR | 10-2015-0055410 A | | 5/2015 |
| KR | 10-1549183 B1 | | 9/2015 |

OTHER PUBLICATIONS

Kim, Dong-Gyu, "Dog watching TV", Energy Economic News, Jun. 21, 2015, 4 pages total.
Mun, Hyeon-Suk, "Broadcast Channels to Enjoy Dog 'Dog TV' Domestic Debut", Hankyoreh, Oct. 18, 2013, 3 pages total.

* cited by examiner

FIG. 11

61 — STANDARD TABLE

| | HUMAN | DOG | CAT | |
|---|---|---|---|---|
| STANDARD FREQUENCY | F1 | F2(75Hz) | F3 | — |
| STANDARD COLOR | C1 | C2 | C3 | — |
| STANDARD BRIGHTNESS | L1 | L2 | L3 | — |
| STANDARD SHARPNESS | S1 | S2 | S3 | — |
| ... | ... | ... | ... | ... |

CONTENT OF F2(75Hz)

CHANGE IMAGE QUALITY VALUE BASED ON REACTION INFORMATION OF DOG (21)

62 — CORRECTION TABLE

| | FIRST DOG | — | FIRST CAT | |
|---|---|---|---|---|
| CORRECTION FREQUENCY | F21(78Hz) | — | F31 | — |
| CORRECTION COLOR | C21 | — | C31 | — |
| CORRECTION BRIGHTNESS | L21 | — | L31 | — |
| CORRECTION SHARPNESS | S21 | — | S31 | — |
| ... | ... | ... | ... | ... |

CONTENT OF F21(78Hz)

FIG. 14
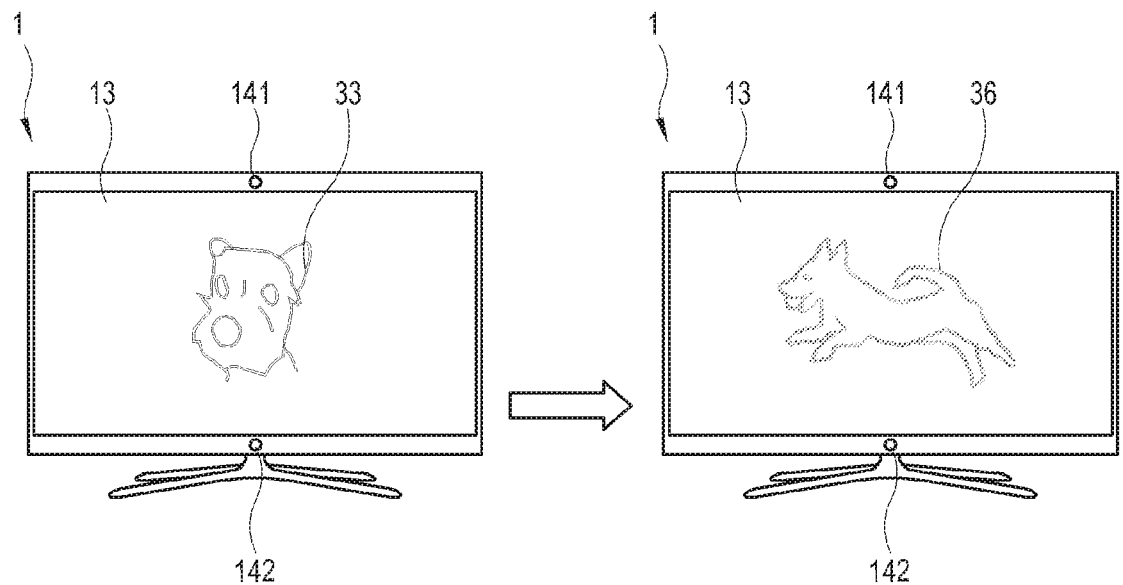
DISPLAY FIRST CONENT(33) DEDICATED FOR DOG BY APPLYING FIRST IMAGE QUALITY VALUE
DISPLAY SECOND CONENT(36) DEDICATED FOR DOG BY APPLYING SECOND IMAGE QUALITY VALUE
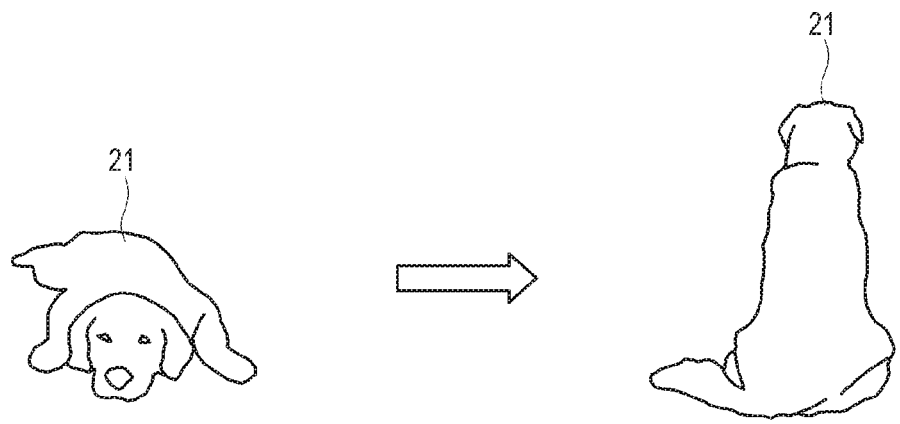

DISPLAY APPARATUS AND CONTROL METHOD THEREOF

CROSS-REFERENCE TO RELATED THE APPLICATION

This application is based on and claims priority under U.S.C. § 119 to Korean Patent Application No. 10-2018-0029109 filed on Mar. 13, 2018, in the Korean Intellectual Property Office, the disclosure of which is incorporated by reference herein in its entirety.

BACKGROUND

1. Field

The disclosure relates to a display apparatus and a display method thereof, and more particularly, to a display apparatus and a display method of providing dedicated content for viewing audience.

2. Description of the Related Art

Recently, there has been an increase in a number of people having a pet (or a companion animal). As such, there are new establishments and services, such as café s, which are dedicated and tailored for pets. A pet may be any one of various types of animals, including a dog, a cat, a hamster, an *iguana*, a snake, etc. Although caring for a pet is laborious, owning the pet has many positive effects because the pets provide their owners emotional stability, confidence, responsibility, etc.

However, the pets are generally kept indoors within a restricted range of activity and spend a lot of time alone while their owners are away. The pets psychologically feel more anxiety and depression and physically become more lethargic as they are left alone for long time. In severe cases, the pets show abnormal behaviors such as excessive aggression, excitement, self-injury, etc.

In an attempt to address this problem, there are provided dedicated content for the pets to watch and feel relaxed. However, the content dedicated for the pets has been neglected by the pets because they are provided in monotonous image or sound quality without reflecting the visual or auditory characteristics of the pets.

SUMMARY

According to an aspect of the disclosure, there is a display apparatus comprising: a display; a communicator configured to communicate with a server; a sensor configured to obtain information about a companion animal; and a processor configured to: control the display to display content based on a first image quality value, transmit the information about the companion animal to the server, receive, from the server, a second image quality value based on the information about the companion animal, and control the display to display the content based on the received second image quality value, wherein the information is obtained by the sensor while the content is displayed based on the first image quality value.

The sensor may comprise a video capturer configured to obtain an image captured in a frontward direction of the display, and the processor maybe further configured to obtain the information about the companion animal based on a shape of an object present within the image obtained by the video capturer while the content is displayed with the first image quality value.

The sensor may comprise an audio receiver configured to obtain a sound, and the processor maybe further configured to obtain the information about the companion animal based on the sound obtained by the audio receiver while the content is displayed with the first image quality value.

The display apparatus may further comprise an audio output unit configured to output a sound, and the processor maybe further configured to output the content with a first sound quality value through the audio output unit, receive a second sound quality value corresponding to the companion animal identified based on the information from the server, and output the content based on the received second sound quality value through the audio output unit.

The processor maybe further configured to receive, from the server, the second image quality value corresponding to the companion animal identified based on a model corresponding to the companion animal, and wherein the model corresponding to the companion animal maybe previously learned using an artificial-intelligence algorithm and stored in the server.

The processor maybe further configured to transmit reaction information of the companion animal obtained by the sensor to the server while the content is displayed with the second image quality value, receive a third image quality value determined based on the reaction information from the server, and display the content with the received third image quality value on the display.

The reaction information maybe used to determine preference of the companion animal for the content, and the third image quality value maybe determined based on the determined preference of the companion animal for the content.

The third image quality value maybe determined based on preference of the companion animal for the content, the preference of the companion animal for the content maybe determined based on a model about a reaction of the companion animal, and the model about the reaction of the companion animal maybe previously learned using an artificial-intelligence algorithm and stored in storage.

The preference of the companion animal for the content maybe determined based on past history information about a reaction of the companion animal.

The preference of the companion animal for the content maybe determined based on information about a reaction of the companion animal received from an external apparatus.

The first image quality value and the second image quality value may comprise at least one of a frequency, color, brightness or sharpness.

According to another aspect of the disclosure there is provided a control method of a display apparatus having a display, the control method comprising: displaying content based on a first image quality value on the display; obtaining information about a companion animal while the content is displayed based on the first image quality value; transmitting the obtained information to a server; receiving, from the server, a second image quality value based on the information about the companion animal; and displaying the content based on the received second image quality value on the display.

The obtaining of the information may comprise obtaining the information about the companion animal based on a shape of an object present within an image obtained while the content is displayed with the first image quality value.

The obtaining of the object information may comprise obtaining the object information about the companion animal based on a sound obtained while the content is displayed with the first image quality value.

The control method may further comprise outputting the content with a first sound quality value through an audio output unit; receiving a second sound quality value corresponding to the companion animal identified based on the information from the server; and outputting the content based on the received second sound quality value through the audio output unit.

The receiving of the second image quality value may comprise: receiving, from the server, the second image quality value corresponding to the companion animal identified based on a model corresponding the companion animal, wherein the model corresponding to the companion animal maybe previously learned using an artificial-intelligence algorithm and stored in the server.

The control method may further comprise: transmitting reaction information of the companion animal, which is obtained while the content is displayed with the second image quality value, to the server; receiving a third image quality value determined based on the reaction information from the server, and displaying the content with the third image quality value on the display.

The third image quality value maybe determined based on preference of the companion animal for the content, which is determined based on the reaction information.

The displaying of the content with the third image quality value on the display may comprise receiving, from the server, the third image quality value determined based on preference of the companion animal for the content, wherein the preference of the companion animal for the content maybe determined based on a model about a reaction of the companion animal, and the model about the reaction of the companion animal maybe previously learned using an artificial-intelligence algorithm and stored in storage.

According to another aspect of the disclosure, there is provided a recording medium, in which a computer program comprising a code for performing a control method of a display apparatus having a display as a computer-readable code is stored, the control method comprising: displaying content based on a first image quality value on the display; obtaining information about a companion animal while the content is displayed based on the first image quality value; transmitting the obtained information to a server; receiving, from the server, a second image quality value based on the information about the companion animal; and displaying the content based on the received second image quality value on the display.

According to another aspect of the disclosure, there is provided a display apparatus comprising: a memory configured to store one or more instructions; and a processor configured to execute the one or more instructions to: control a display to display content based on a first image quality value, obtain information about a companion animal while the content is displayed based on the first image quality value, determine a second image quality value based on the information about the companion animal, and control the display to display the content based on the second image quality value.

According to another aspect of the disclosure, there is provided a display apparatus comprising: a memory configured to store one or more instructions; and a processor configured to execute the one or more instructions to: output content having a characteristic based on a first value corresponding to an output feature of the content, obtain information about a companion animal while the content is output based on the first value, determine a second value corresponding to an output feature of the content based on the information about the companion animal, and change the characteristic of the output content based on the second value.

The characteristic of the output content maybe one of a visual characteristic of the output content or an acoustic characteristic of output content.

The second value maybe determined based on a content perception characteristic of the companion animal.

According to another aspect of the disclosure, there is provided a display apparatus comprising: a memory configured to store one or more instructions; and a processor configured to execute the one or more instructions to: output content having a characteristic based on a first value corresponding to an output feature of the content, obtain information about a target viewer while the content is output based on the first value, determine a second value corresponding to an output feature of the content based on the information about the target viewer, and change the characteristic of the output content based on the second value, wherein the information about the target viewer is obtained based on a shape depicting a physical appearance of the target viewer in a captured image.

The characteristic of the output content maybe one of a visual characteristic of the output content or an acoustic characteristic of output content.

The second value maybe determined based on a content perception characteristic of the target viewer.

BRIEF DESCRIPTION OF THE DRAWINGS

The above and/or the aspects will become apparent and more readily appreciated from the following description of embodiments, taken in conjunction with the accompanying drawings, in which:

FIG. 11 illustrates an example of determining an image quality value at operations S44 and S47 of FIG. 8;

FIG. 14 illustrates an example of changing content at operation S45 or S48 of FIG. 8.

DETAILED DESCRIPTION OF EXEMPLARY EMBODIMENTS

Figure 1:
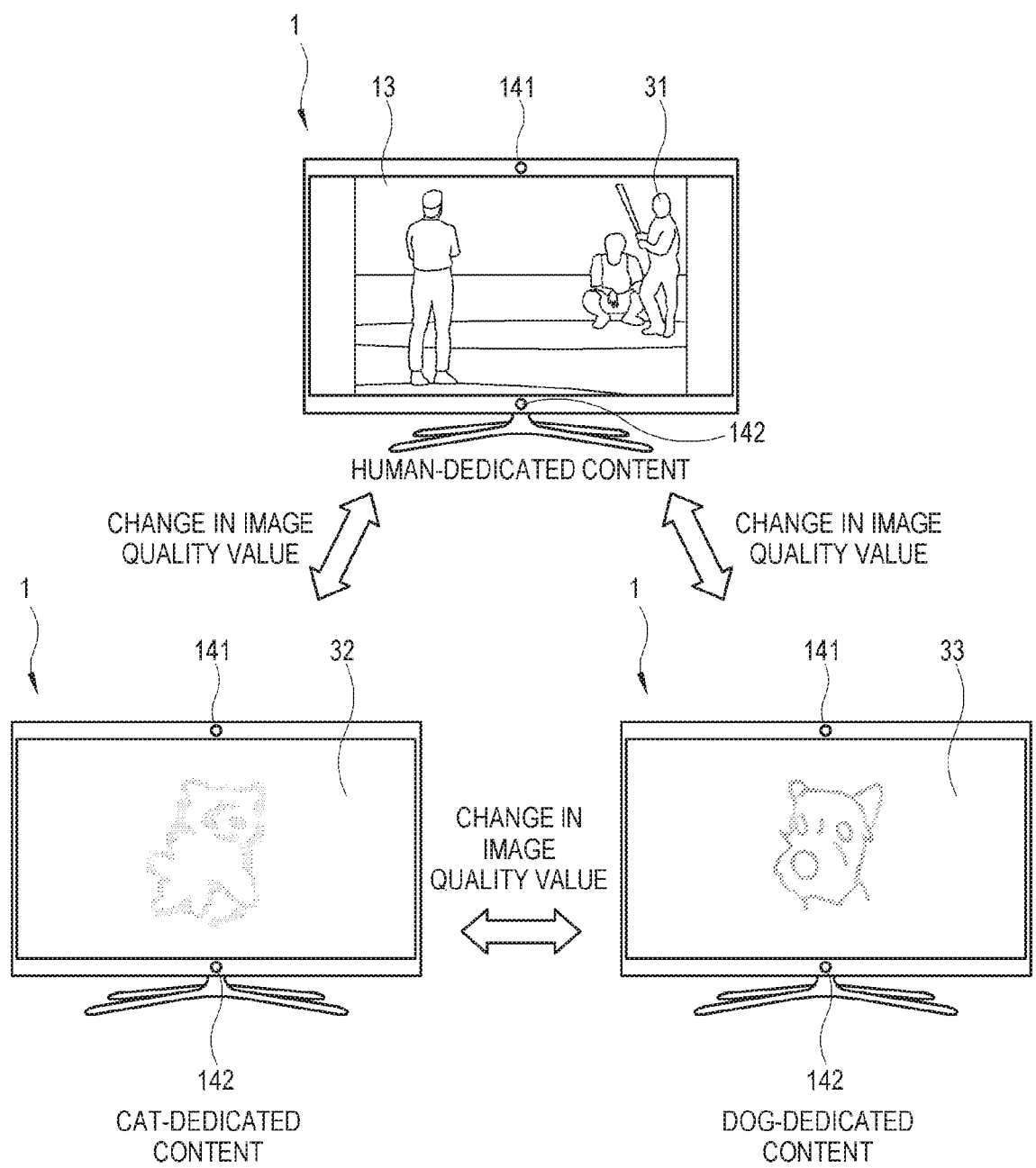
FIG. 1 illustrates a display apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same function. In the disclosure, at least one among a plurality of elements refers to not only all the plurality of elements but also both each one of the plurality of elements excluding the other elements and a combination thereof.

FIG. 1 illustrates a display apparatus according to an embodiment of the disclosure. The display apparatus 1 may be realized by a television (TV) capable of outputting content. However, the display apparatus 1 is not limited to the TV, but may be realized by various electronic apparatuses capable of outputting multimedia content involving at least one of video content, audio content, a text or a picture, for example, a smart TV, an Internet protocol (IP) TV, a smart phone, a tablet computer, a smart watch, a head-mounted display or the like wearable device, a computer a multimedia player, an electronic frame, a digital billboard, a large format display (LFD), a digital signage, a set-top box, a set-top box, a refrigerator, etc. without limitations.

The display apparatus 1 may employ at least one of machine learning, a neural network or a deep-learning algorithm as a rule-based or artificial-intelligence algorithm to perform at least a part of data analysis, process, and result information generation for implementing various functions such as content output. The neural network topology may have a plurality of nodes arranged in a different numbers and types of layers, with a collection of training data set used for training the model. Also, such AI/Deep Learning network architectures are provided with encoders/decoders, projections and softmax layers, and cross entropy calculations to train the AI model.

The display apparatus 1 may provide various pieces of content in accordance with target viewers. For example, the content may include not only content dedicated for a human, such as news, sports, arts, entertainment, popular songs, dramas, movies, etc., but also content dedicated for various companion animals such as dogs, cats, etc. According to an embodiment, the display apparatus may include a video capturer 141 and an audio receiver 142.

The display apparatus 1 may apply a set value suitable for the visual or auditory characteristics of the target viewer, i.e. a human or a companion animal to thereby output content (hereinafter, referred to as 'human dedicated content' or 'companion-animal dedicated content'). Here, the set value may include at least one of an image quality value or a sound quality value to be applied in outputting content. The image quality value may include a value about at least one of a frequency, color, brightness, or sharpness of an image based on content. The sound quality value may include a value about at least one of a pitch, loudness, rhythm, or tone of a sound based on content. However, the set value is not limited to the image quality value or the sound quality value.

Referring to FIG. 1, the image quality value is varied depending on the target viewers. For example, the display apparatus 1, which is displaying human-dedicated content 31 on a display 13 by applying an image quality value suitable for a human, may switch over to displaying cat-dedicated content 32 by applying an image quality value suitable for visual characteristics of a cat or displaying dog-dedicated content by applying an image quality value suitable for visual characteristics of a dog. In other words, the image quality value may be changed as the dedicated content is changed corresponding to the target viewer. However, changes to the dedicated content corresponding to the target viewer are not limited to the change in the image quality value. According to another embodiment, the dedicated content may be output with the sound quality value changed corresponding to the target viewer.

Thus, the dedicated content is displayed with the image quality value corresponding to the visual characteristics of the target viewer, so that a human or a companion animal can easily and stably view each individual dedicated content through one display apparatus 1.

Figure 2:
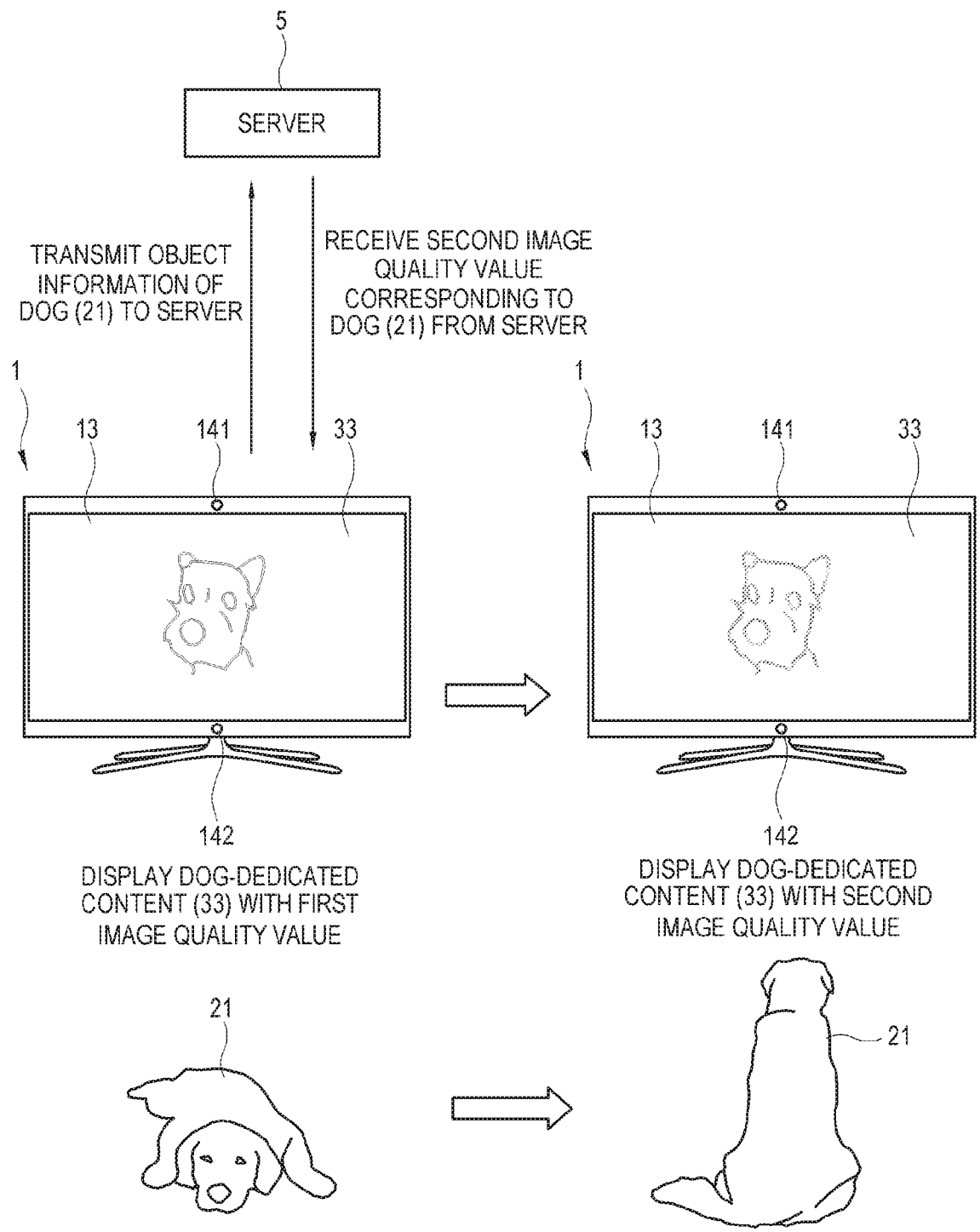
FIG. 2 illustrates a display apparatus according to another embodiment of the disclosure.

FIG. 2 illustrates a display apparatus according to another embodiment of the disclosure. When the target viewer is a companion animal, the display apparatus 1 may display the dedicated content based on the image quality value corresponding to the companion animal identified through a server 5.

Referring to FIG. 2, in a case of displaying the dog-dedicated content 33 by way of example, the display apparatus 1 may obtain object information about a specific dog 21 while displaying the dog-dedicated content 33 based on a first image quality value, and provide the obtained object information to the server 5.

The server 5 identifies the dog 21 based on the object information, and determines a second image quality value corresponding to the identified dog 21. Here, identifying the dog 21 may include identifying at least one of the breed, age, sex or size of the dog 21.

Meanwhile, the server 5 may employ at least one of machine learning, a neural network or a deep-learning algorithm as a rule-based or artificial-intelligence algorithm to identify the dog 21 or perform at least a part of data analysis, process, and result information generation for determining the second image quality value corresponding to the identified dog 21.

The display apparatus 1 may receive the second image quality value from the server 5, change the first image quality value into the second image quality value, and display the dedicated content 33 by applying the changed second image quality value, thereby providing the content 33 suitable for the visual characteristics of the specific dog 21.

Although the foregoing description shows that the dog-dedicated content 33 is displayed based on the image quality value changed corresponding to the identified dog 21, the content may be output based on the sound quality value changed corresponding to the identified dog 21.

Figure 3:
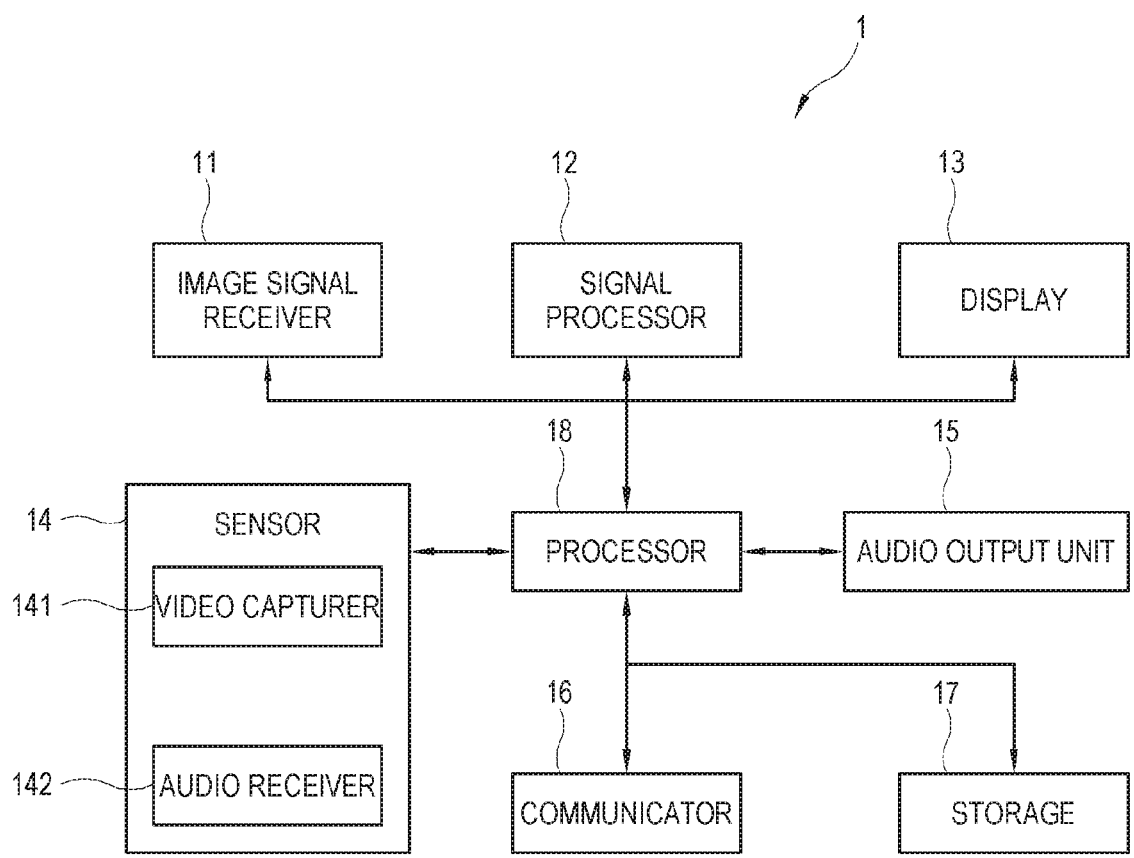
FIG. 3 is a block diagram of a display apparatus of FIG. 2.

FIG. 3 is a block diagram of a display apparatus of FIG. 2 according to an embodiment. The display apparatus 1 may include an image signal receiver 11, a signal processor 12, a display 13, a sensor 14, an audio output unit 15, a communicator 16, a storage 17, or a processor 18.

The image signal receiver 11 may receive an image signal from an external apparatus. For example, the image signal receiver 11 may receive a cable image signal or an IP image signal from a cable TV or IP TV. However, there are no limits to the external apparatus that provides the image signal, and alternatively the image signal receiver 11 may receive the image signal from a digital versatile disc (DVD), a smart phone, a tablet computer, or the like portable storage medium.

The signal processor 12 may perform video processing on an image signal received in the image signal receiver 11 so that the display 13 can display an image. The video processing is not limited to a particular kinds of video processing. As such, the video processing may, for example, include decoding, scaling, noise reduction, detail enhancement, frame refresh rate conversion, etc. in accordance with the types of the image signal. Further, the signal processor 12 may perform audio processing on an audio signal received through an audio receiver 142, so that the audio output unit 15 can output a sound. The signal processor 12 may include a hardware processor realized by a chipset, a circuit, a buffer, etc. mounted on a printed circuit board, and may be also designed as a system on chip (SoC).

The display 13 displays an image based on a processed video signal on a screen thereof. The display 13 may be realized by a liquid crystal display, a thin film transistor-liquid crystal display, an organic light-emitting diode, a flexible display, a 3-dimensional (3D) display, etc.

The sensor 14 may obtain information about a human or a companion animal, and may include a video capturer 141, an audio receiver 142, etc. The video capturer 141 maybe an image sensor for capturing an image in a frontward direction of the display apparatus 1 and obtaining image information about a human or a companion animal from the captured image. The video capturer 141 may be realized by a complementary metal oxide semiconductor (CMOS) or charge coupled device (CCD) camera.

The audio receiver 142 may obtain audio information of a human or a companion animal, and may be realized by a microphone. However, there are no limits to the kinds of the sensor 14, and the sensor 14 may further include an infrared sensor that obtains information about a shape of a human or companion animal by measuring time taken for an infrared signal to output forward and return to the display apparatus 1.

The audio output unit 15 may output an audio signal processed by the signal processor 12 to the outside, and may be realized by at least one speaker, i.e., a loudspeaker.

The communicator 16 may perform wireless communication with the external apparatus such as the server 5 or another display apparatus through various communication standards. For example, the communicator 16 may perform wireless communication based on Wi-Fi, Bluetooth, ZigBee, Wi-Fi Direct (WFD), ultra-wideband (UWB), infrared Data Association (IrDA), Bluetooth low energy (BLE), near field communication (NFC), etc.

The storage 17 may include a storage medium of at least one type among a flash memory type, a hard disk type, a multimedia card micro type, a card type memory (e.g. a secure digital (SD) or extreme digital (XD) memory, etc.), a random access memory (RAM), and a read only memory (ROM). The storage 17 may be realized by a web storage that operates on the Internet.

The processor 18 may control general elements of the display apparatus 1. For example, the processor 18 may control the display 13 or the audio output unit 15 to output content dedicated for a companion animal by applying a preset first set value, and control the sensor 14 to obtain object information about the companion animal while the content dedicated for the companion animal is output.

The processor 18 may control the communicator 16 to transmit the object information to the server 5 and receive a second set value matching the object information from the server 5, and control the display 13 or the audio output unit 15 to output content dedicated for the companion animal by applying the received second set value.

The processor 18 may include a control program (or instruction) for performing control with regard to general elements, a nonvolatile memory in which the control program is installed, a volatile memory in which at least a part of the installed control program is loaded, and at least one sub-processor or central processing unit (CPU) for executing a loaded control program. Further, such a control program may be stored in an electronic apparatus other than the display apparatus 1.

The control program may include a program(s) realized in the form of at least one among a basis input/output system (BIOS), a device driver, an operating system, a firmware, a platform, and an application. According to an exemplary embodiment, the application may be previously installed or stored when the display apparatus 1 is manufactured, or may be installed based on application data received from the outside when it is used in the future. The application data may for example be downloaded from an application market and the like external server. Such a server is an example of a computer program product, but not limited to this example.

The display apparatus 1 may exclude at least one element from the foregoing configuration or may add another element to the foregoing configuration. For example, the display apparatus 1 may further include a power supply and a user input. The power supply may receive external power or internal power under control of the processor 18 and supply power necessary for the elements of the display apparatus 1.

Further, the user input may generate key input data corresponding to an input that a user makes for controlling the operations of the display apparatus 1, and may be realized by a key pad, a dome switch, a touch pad (resistive/capacitive), a jog wheel, a jog switch, a finger mouse, etc.

Figure 4:
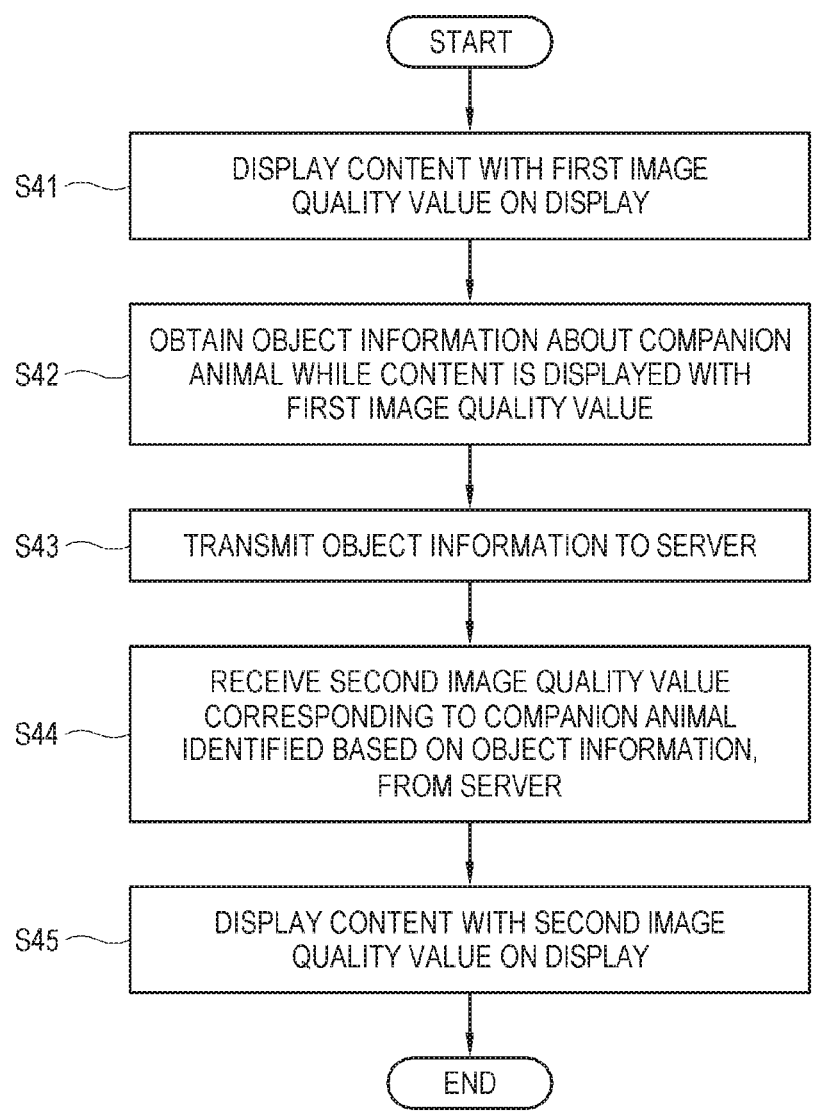
FIG. 4 illustrates a control method of the display apparatus of FIG. 2.

FIG. 4 illustrates a control method of the display apparatus of FIG. 2 according to an embodiment. Referring to FIG. 4, the display apparatus 1 may display content on the display 13 by applying a first image quality value under control of the processor 18 (S41). According to an embodiment, the first image quality value may be a preset or predetermined value.

For example, in a case of displaying the dog-dedicated content 33, the first image quality value for the dog-dedicated content is previously set to have high green and blue levels, a low red level and a low brightness level or have a frequency band of 70-80 Hz as compared to image quality values for the human-dedicated content because a dog has visual characteristics of red-green color blindness and seeing in the dark better than a human.

Further, the processor 18 obtains object information about the companion animal through the sensor 14 while content based on the first image quality value is displayed (S42), and transmits the obtained object information to an external device, such as the server 5 (S43).

For example, in a case of displaying the dog-dedicated content 33, the processor 18 may obtain object information about the target viewer of the content 33, i.e. a specific dog 21 while the dog-dedicated content 33 is displayed at a preset frequency of 70 Hz. Here, the object information may include the shape, motion, sound, or other information relating to the dog 21.

Further, the processor 18 may receive a second image quality value corresponding to a companion animal identified based on the object information from the server 5 (S44), and display content on the display by applying the received second image quality value (S45).

For example, in a case of displaying the dog-dedicated content 33, the content 33 displayed at the frequency of 70 Hz may not reflect visual characteristics of a specific dog 21, and therefore the processor 18 receives the second image quality value for a frequency corresponding to a specific dog identified based on the object information of the dog, i.e., a frequency of 75 Hz, from the server 5, and displays the content 33 by applying the second image quality value for the frequency of 75 Hz. However, the change in the image quality value is not limited to the frequency, and thus at least one of the frequency, color, brightness, sharpness or other characteristics of the content may be changed individually or at least two of them may be changed at a time.

According to another embodiment, the processor 18 may internally determine the second image quality value corresponding to a companion animal identified based on the object information. As such, the processor 18 may not transmit the obtained object information to an external device, such as the server 5 in S43.

In the foregoing description, the content is displayed based on the image quality value changed corresponding to the identified dog 21. According to another embodiment, the content may be displayed based on the sound quality value changed corresponding to the identified dog 21.

Figure 5:
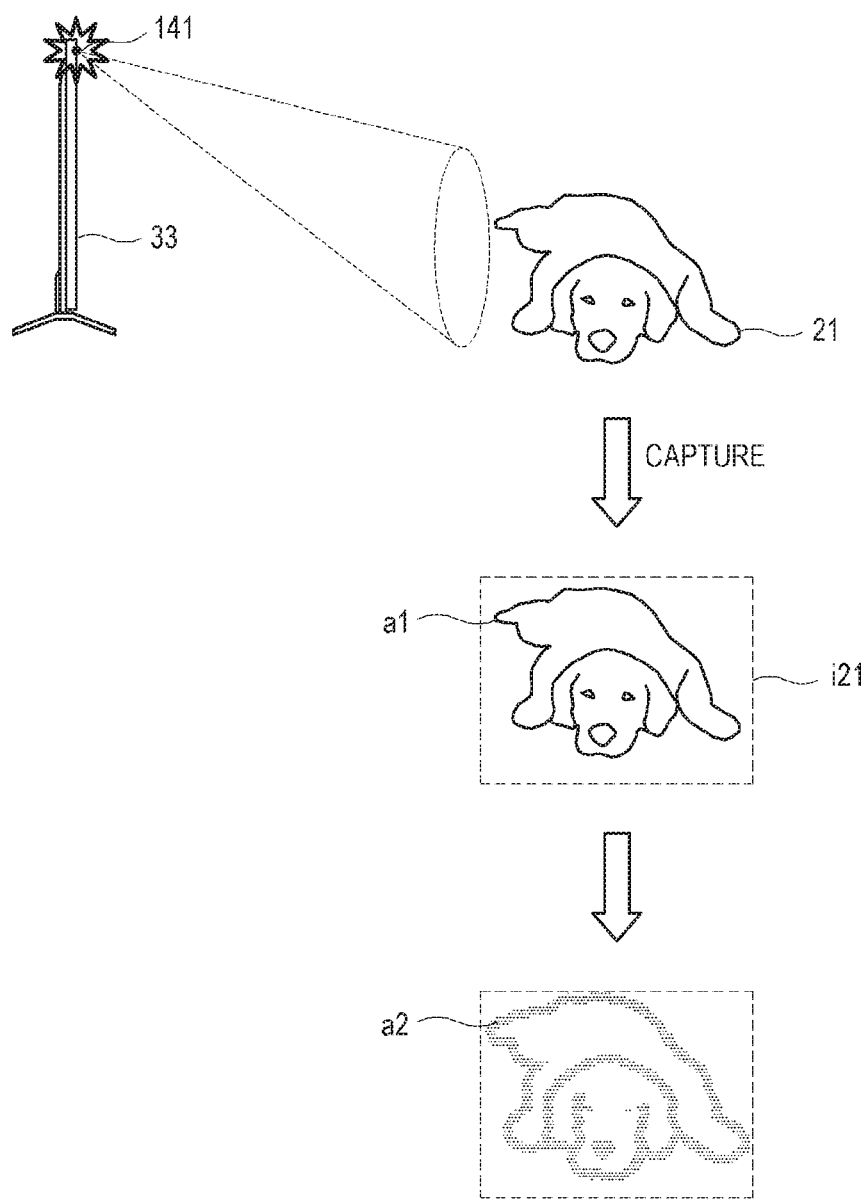
FIG. 5 illustrates an example of obtaining object information of a companion animal at operation S42 of FIG. 4.

FIG. 5 illustrates an example of obtaining object information of a companion animal at operation S42 of FIG. 4. Below, it will be described that the dog-dedicated content 33 is described by way of example, but the disclosure is not limited to this example.

Referring to FIG. 5, the processor 18 may control the video capturer 141 to capture an image in a frontward direction of the display 13 while the content 33 is displayed by applying the preset first image quality value. Because there are no limits to the capturing point in time and the number of capturing times, the front image may for example be captured immediately after displaying the content 33, after elapsing a predetermined period of time from displaying the content 33, or at predetermined intervals.

The processor 18 can detect feature points of an object present in a captured image i21. Here, the feature points may refer to a contour a2 that forms a shape a1 of an object, and the contour a2 may be the object information about the dog 21.

The processor 18 may use various image recognition algorithms, for example, convolution neural networks (CNN) or histogram of oriented gradient (HOG), to detect the contour a2, but the image recognition algorithm is not limited to this example.

Figure 6:
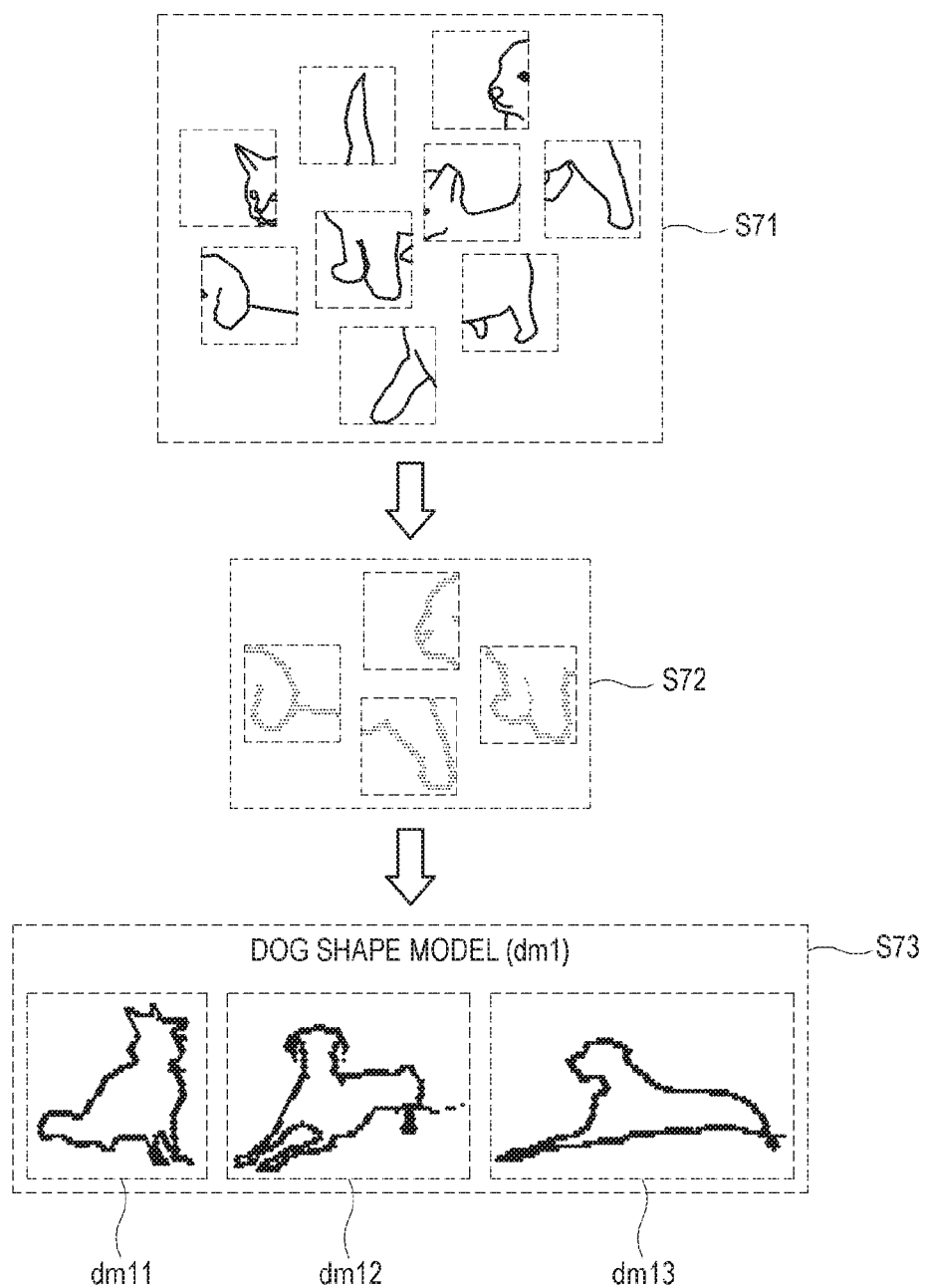
FIG. 6 illustrates a process of generating an identification shape model for comparison with the object information of FIG. 5.

FIG. 6 illustrates a process of generating an identification shape model for comparison with the object information of FIG. 5. Below, a shape model for a dog will be described by way of example, but the shape model is not limited to a dog.

The server 5 may obtain an identification patch image about a dog to generate a dog shape model dm1 (S71). Here, the identification patch image may refer to an image that includes a shape showing a part or the entire of a dog, and may be received from the display apparatus 1 or obtained from a result of searching the Internet. However, there are no limits to the identification patch image.

The server 5 may detect the feature points from the identification patch image (S72). Here, the feature points may refer to a contour forming a shape, which shows a part or the entire of a dog. To detect the feature points from the identification patch image, various image recognition algorithms, for example, CNN or HOG, may be used without limitations.

The server 5 may sort contours of a dog shape detected from the identification patch image with respect to various criteria, and groups the sorted contours of the shapes to thereby generate the dog shape model dm1 (S73). Here, sorting the contours of a dog shape with respect to various criteria may include classifying the contours of the dog shape according to the breed, age, sex, size, appearance, head, pose, etc. of the dog. That is, the dog shape model dm1 may include a plurality of shape models dm11, dm12 and dm13 grouped according to various criteria.

The server 5 may generate shape models cm1 for companion animals of other species by a similar method of generating the dog shape model dm1, and may store an identification shape model m1 that includes the dog shape model dm1 and the shape models for the companion animals of other species. However, without limitations, the identification shape model m1 may be entirely or partially received from the display apparatus 1, or other devices such as servers.

The foregoing descriptions show the process where the server 5 generates the identification shape model m1, but the disclosure is not limited to this process. Alternatively, the display apparatus 1 may generate the identification shape model m1 by a process similar to the process where the server 5 generates the identification shape model m1.

For example, the processor 18 obtains an identification patch image based on capturing of the video capturer 141 or a result of searching the Internet, and detects a contour of a dog shape from the obtained identification patch image by various image recognition algorithms. Further, the contours of the dog shape may be sorted, and the sorted contours are grouped to thereby generate the dog shape model dm1. The storage 17 is configured to store the identification shape model m1 that includes the dog shape model dm1 and shape models for companion animals of other species.

Meanwhile, the server 5 or the processor 18 of the display apparatus 1 may employ at least one of machine learning, a neural network or a deep-learning algorithm as a rule-based or artificial-intelligence algorithm to perform at least a part of data analysis, process, and result information generation for generating the identification shape model m1.

Figure 7:
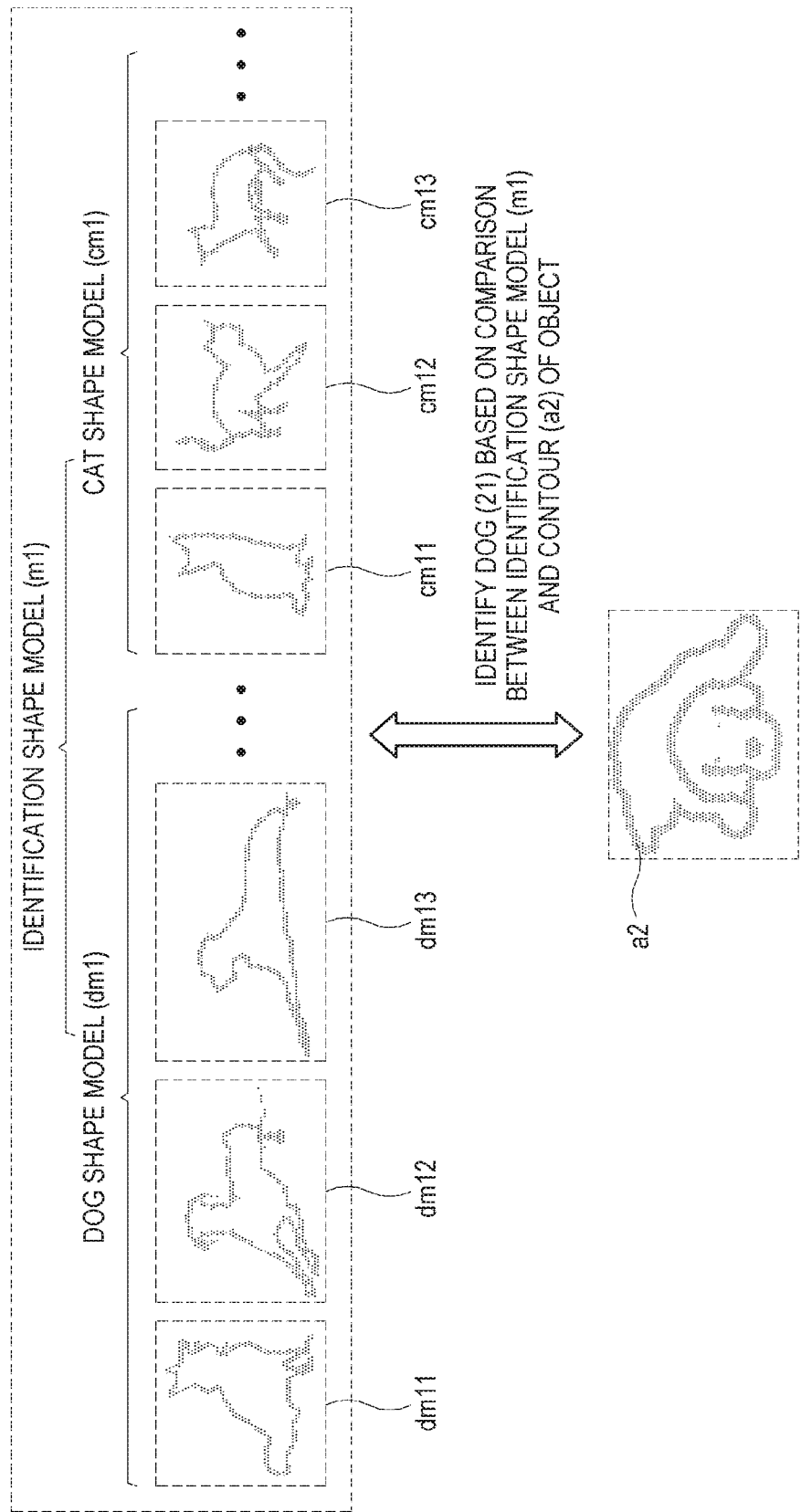
FIG. 7 illustrates a process of identifying a companion animal based on comparison between the object information and the shape model.

FIG. 7 illustrates a process of identifying a companion animal based on comparison between the object information and the shape model. Below, the comparison between the object information and the shape model for a dog will be described by way of example, but the disclosure is not limited to this example.

The server 5 may receive the object information, i.e., a contour a2 of an object shape a1 from the display apparatus 1, and perform comparison to determine which one of the identification shape models m1 matches the received contour a2 of the object shape a1.

When the contour a2 of the object shape a1 corresponds to one among the plurality of shape models dm11, dm12 and dm13, the server 5 identifies an object present within the captured image i21 is a specific dog 21.

The foregoing description shows the process where the server 5 identifies the specific dog 21, but the disclosure is not limited to this description. Alternatively, the display apparatus 1 may identify that an object present in the captured image i21 is the specific dog 21 by a similar process.

For example, the processor 18 may perform comparison to determine which one of the identification shape models m1 stored in the storage 17 matches the object information, i.e. the contour a2 of the object shape a1. When the contour a2 of the object shape a1 corresponds to one among the plurality of shape models dm11, dm12 and dm13 of the dog shape model dm1, the processor 18 identifies the object present within the captured image i21 is the specific dog 21.

Meanwhile, the server 5 or the processor 18 of the display apparatus 1 may employ at least one of machine learning, a neural network or a deep-learning algorithm as a rule-based or artificial-intelligence algorithm to perform at least a part of data analysis, process, and result information generation for identifying a dog 21 based on the object information.

Figure 8:
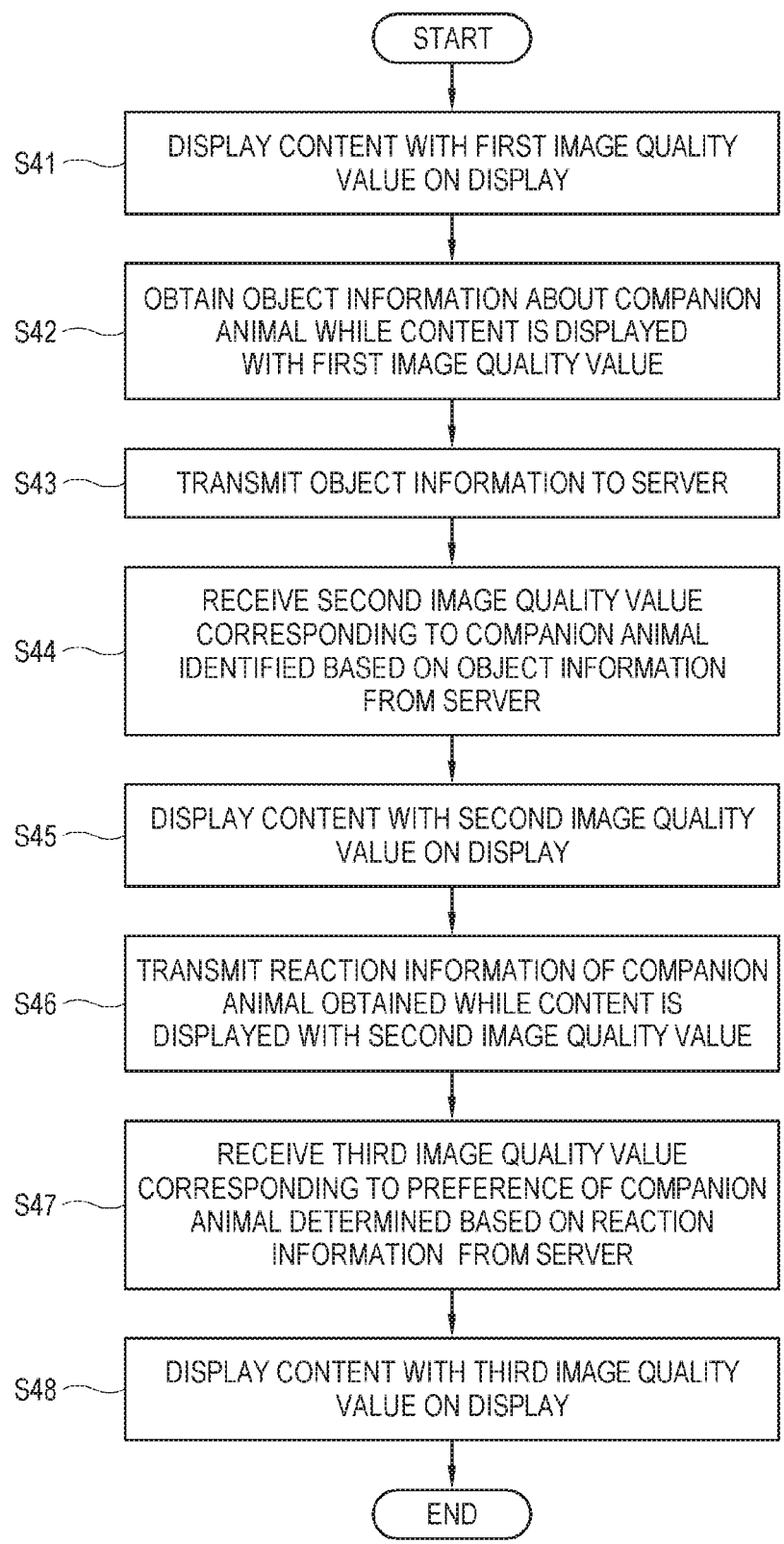
FIG. 8 illustrates a control method of a display apparatus according to still another embodiment of the disclosure.

FIG. 8 illustrates a control method of a display apparatus according to another embodiment of the disclosure. In the control method of the display apparatus 1 illustrated in FIG. 8, the method includes operations S41 to S45 of the control method illustrated in FIG. 4. As such, repetitive descriptions about the operations S41 to S45 in the control method of the display apparatus described with reference to FIG. 4 will be avoided. According to another embodiment, the control method may not operations S41 to S45 of the control method illustrated in FIG. 4.

Referring to FIG. 8, the processor 18 may obtain reaction information of a companion animal while displaying the content to which the second image quality value is applied, and transmit the obtained reaction information to an external device such as the server 5 (S46).

For example, in the case of displaying the dog-dedicated content 33, the processor 18 may obtain the reaction information about the target viewer of the content 33, i.e. the specific dog 21 while displaying the content 33 with the second image quality value corresponding to the specific dog 21, for example, at a frequency off 75 Hz. Here, the reaction information may include an expression, a pose, a motion, etc. of when the dog 21 pays attention to or is interested in something or when the dog 21 is indifferent to or hostile toward something.

Further, the server 5 may determine a preference of a companion animal with regard to content displayed with a second image quality value based on the reaction information received from the display apparatus 1, and determine a third image quality value based on non-preference.

For example, in the case of displaying the dog-dedicated content 33, when the server 5 determines that the dog 21 does not prefer the content 33 displayed at the frequency of 75 Hz based on the reaction information, the third image quality value may be determined with another frequency, for example, 78 Hz, different from 75 Hz.

Further, the display apparatus 1 receives the third image quality value, which corresponds to the preference of the companion animal determined based on the reaction information, from the server 5 (S47), and displays content with the third image quality value (S48).

For example, when the dog-dedicated content 33 is displayed, the processor 18 may display the content 33, to which the third image quality value having a frequency of 78 Hz received from the server 5 is applied, on the display 13. However, the change in the image quality value is not limited to the frequency, and thus at least one of the frequency, color, brightness, sharpness or other characteristics of the content may be changed individually or at least two of them may be changed at a time.

According to another embodiment, the processor 18 may internally determine the third image quality value corresponding to a companion animal identified based on the reaction information. As such, the processor 18 may not transmit the obtained reaction information to an external device, such as the server 5 in S46.

Meanwhile, the processor 18 may execute a dedicated application to implement the foregoing operations. In this embodiment, the dedicated application may be one of at least one control programs described above, and may be defined based on a predetermined rule.

For example, the display apparatus 1 may receive a path rule for implementing the operations from the server 5, and execute the dedicated application in accordance with the received path rules. When the dog-dedicated content 33 is displayed by way of example, the display apparatus 1 obtains the reaction information of the dog 21 while displaying the content 33 to which the second image quality value is applied, transmits the obtained reaction information to the server 5, and executes the dedicated application so that the content 33 can be displayed with the third image quality value received from the server 5, in accordance with the path rule received from the server 5.

According to another embodiment, a smart phone or the like external apparatus receives the path rule from the server 5, and transmits information corresponding to the path rule, for example, a state identification parameter to the display apparatus 1 so that the dedicated application can be executed in accordance with the path rule. That is, the smart phone receives the path rule from the server 5 and transmits information corresponding to the path rule to the display apparatus 1, and the display apparatus 1 performs the same operations as described above in accordance with the path rule corresponding to the information received from the smart phone.

According to yet another embodiment, the storage 17 of the display apparatus 1 may store a path rule for implementing some or all of the operations illustrated in FIG. 4 and FIG. 8.

Meanwhile, the operations of the display apparatus 1 for making the image quality value be adaptively varied depending on the preference of the dog 21 for the dog-dedicated content 33 may be repeated several times until the dog 21 shows a preference reaction. When the dog 21 shows the preference reaction to the content 33 displayed with the third image quality value adaptively varied depending on the reaction information of the dog 21, the server 5 may store the third image quality value corresponding to the dog 21 as past history information. Further, when the dog-dedicated content is displayed in the future and the dog 21 is identified based on the object information, the server 5 transmits the third image quality value corresponding to the dog 21 based on the past history information of the dog 21 to the display apparatus 1 so that the display apparatus 1 can display the content 33 with the third image quality value.

Figure 9:
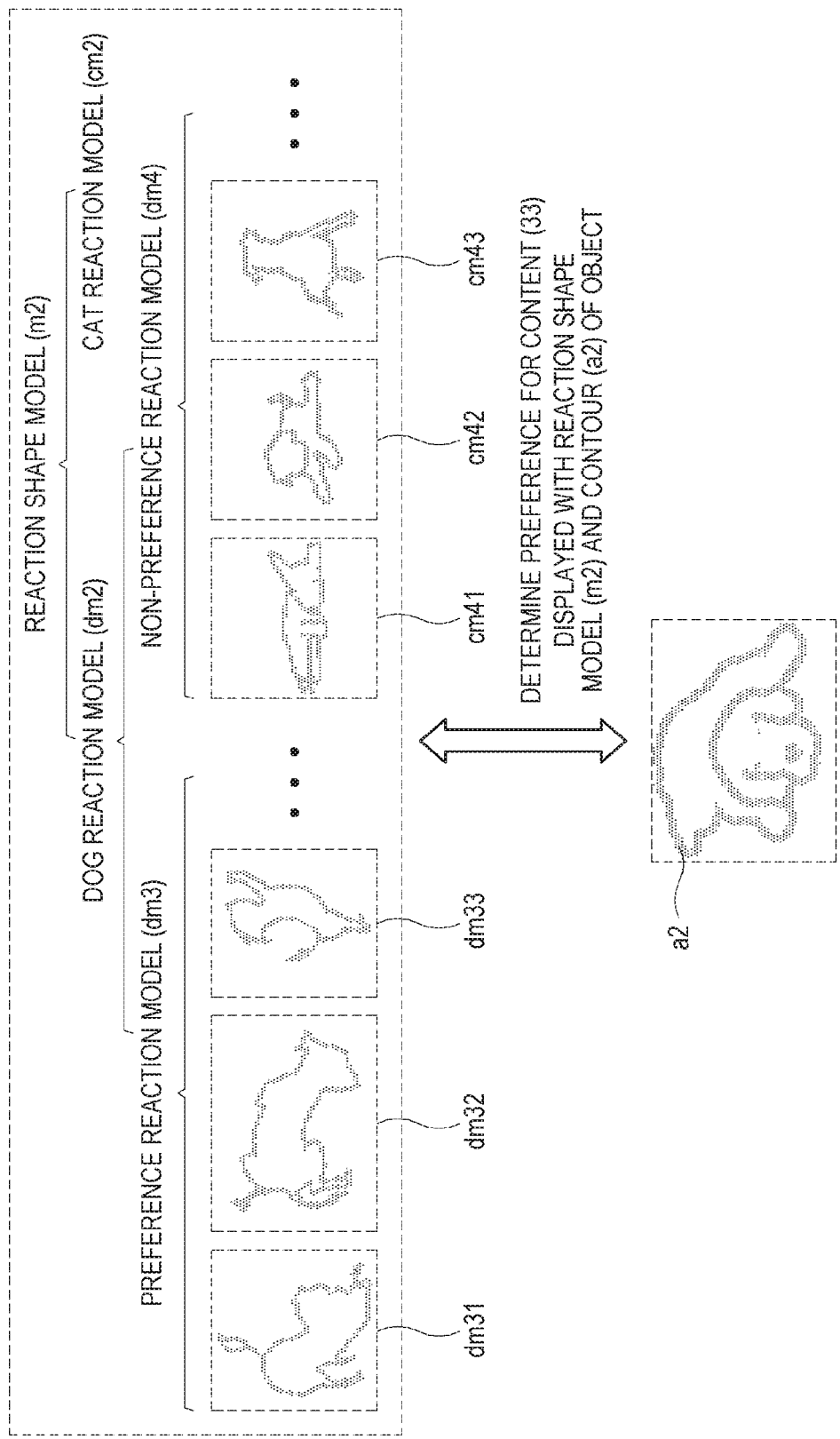
FIG. 9 illustrates a process of determining preference of a companion animal based on comparison between reaction information and a reaction model.

FIG. 9 illustrates a process of determining preference of a companion animal based on comparison between reaction information and a reaction model. Below, the comparison between the reaction information and the reaction model for a dog will be described by way of example, but the disclosure is not limited to this example.

The server 5 may generate or learn a dog reaction model dm2, using some processes similar to those of generating or learning the dog shape model dm1 shown in FIG. 6, and thus descriptions will be made focusing on different parts.

The server 5 may obtain a reaction patch image about a reaction of a dog. Here, the reaction patch image may refer to an image that includes a shape showing a reaction of a dog, as a shape showing a part or the entire of the dog. For example, the reaction patch image may be related to an expression, a pose, a motion, etc., of when a dog pays attention to or is interested in something or when the dog is indifferent to or hostile toward something. Such a reaction patch image may be received from the display apparatus 1 or obtained from a result of searching the Internet, but there are no limits to the reaction patch image.

The server 5 may detect a contour of a reaction shape showing a part of the entire of a dog from the reaction patch image. To this end, various image recognition algorithms, for example, CNN or HOG, may be employed, but the image recognition algorithm is not limited to this example.

The server 5 may sort contours of a dog reaction shape with respect to the expression, the pose, the motion, etc., and groups the sorted contours of the reaction shapes to thereby generate the dog reaction model dm2. The dog reaction model dm2 may include a preference reaction model dm3 and a non-preference reaction model dm4, which are grouped according to reactions of a dog.

The server 5 may generate or learn reaction models cm2 for companion animals of other species by a similar method of generating and learning the dog reaction model dm2, and may store a reaction shape model m2 that includes the dog reaction model dm2 and the reaction models cm2 for the companion animals of other species. However, without limitations, the server 5 may entirely or partially receive the reaction shape model m2 from the display apparatus 1, other servers, etc.

Meanwhile, the server 5 may employ at least one of machine learning, a neural network or a deep-learning algorithm as a rule-based or artificial-intelligence algorithm to perform at least a part of data analysis, process, and result information generation for generating the reaction shape model m2.

Thus, the server 5 with the reaction shape model m2 receives the reaction information of the dog 21 obtained by the display apparatus while the content 33 is displayed with the second image quality value, and determines the third image quality value based on the received reaction information. Here, the reaction information may refer to a contour a2 forming an object shape a1 which is present within the image i21 captured by the display apparatus 1.

The server 5 may determine whether the dog 21 prefers the content 33 displayed with the second image quality value, based on a matching between the reaction information, i.e. the contour a2 of the object shape a1 and either of the preference reaction model dm3 or the non-preference reaction model dm4 of the dog reaction model dm2.

When the contour a2 of the object shape a1 matches one of the non-preference reaction models dm4 and it is thus determined that the dog 21 does not prefer the content 33 displayed with the second image quality value, the third image quality value is determined corresponding to the non-preference and the determined third image quality value is transmitted to the display apparatus 1.

The foregoing descriptions show the process where the server 5 generates the reaction shape model m2, but the disclosure is not limited to this process. Alternatively, the display apparatus 1 may generate the reaction shape model m2 by a process similar to the process where the server 5 generates the reaction shape model m2.

For example, the processor 18 obtains a reaction patch image based on capturing of the video capturer 141 or a result of searching the Internet, and detects a contour of a dog reaction shape from the obtained reaction patch image by various image recognition algorithms. Further, the contours of the dog reaction shape may be sorted with respect to the reactions according to the expression, the pose, the motion, etc. and the sorted contours of the reaction shapes are grouped to thereby generate the dog reaction model dm2 including the preference reaction model dm3 and the non-preference reaction model dm4 which are grouped according to the dog's reactions. The reaction shape model m2 including the dog reaction model dm2 and the reaction models for the companion animals of other species may be stored.

Figure 10:
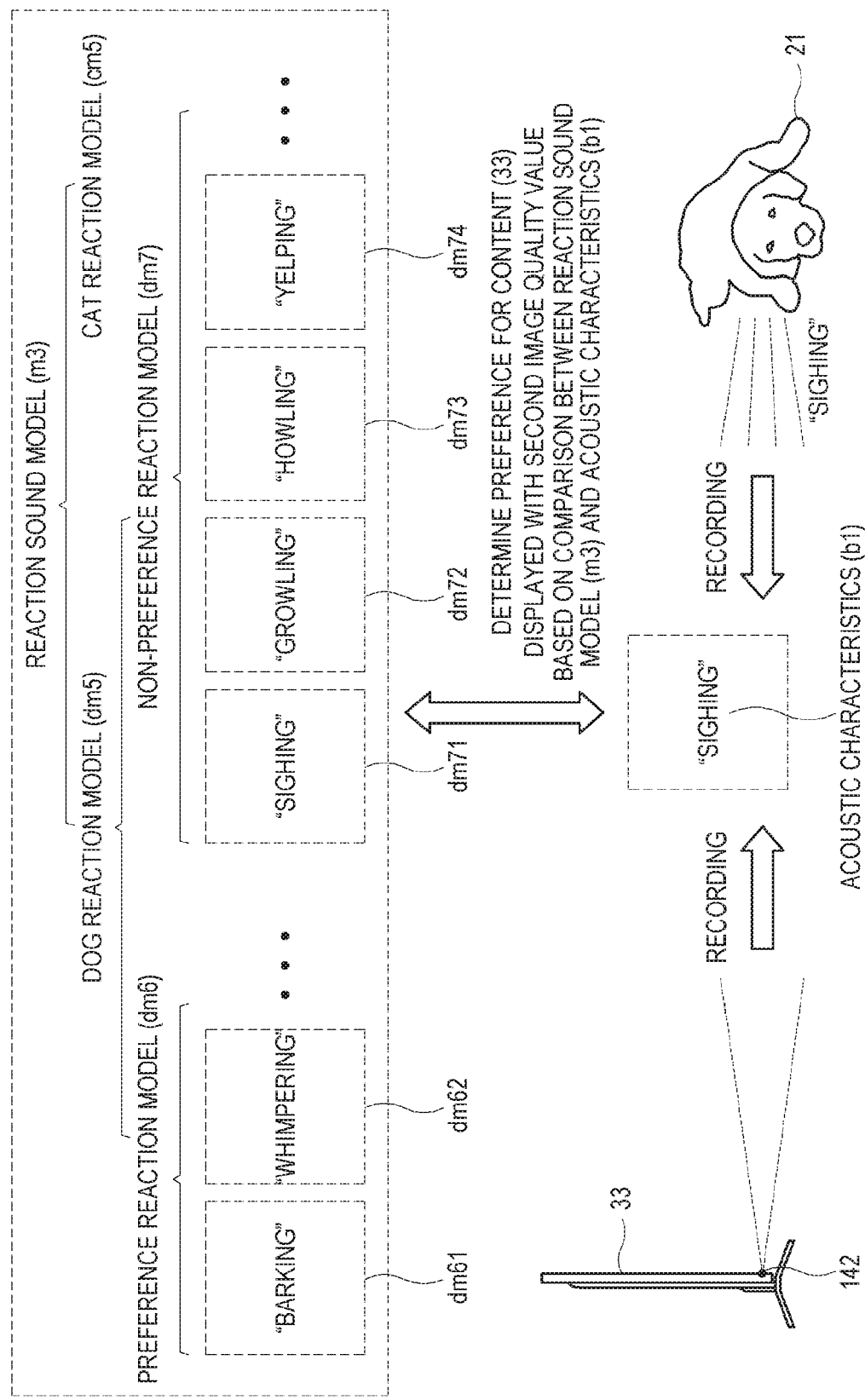
FIG. 10 illustrates a process of determining preference of a companion animal based on a sound reaction of the companion animal.

FIG. 10 illustrates a process of determining preference of a companion animal based on a sound reaction of the companion animal. Below, comparison between reaction information about a sound of a dog and a reaction model will be described by way of example, but the comparison is not limited to this example.

The display apparatus 1 according to an embodiment includes the audio receiver 142 to receive a sound of a dog, which is made in front of or around the display 13, and obtains sound reaction information from the sound of the dog 21, which is received through the audio receiver 142 while the content 33 is output with the second sound quality value. Here, the sound reaction information may refer to acoustic characteristics b1 such as a pitch, loudness, rhythm, tone, etc., detected from a sound.

Meanwhile, the server 5 may generate or learn a dog reaction model dm5 about a sound, most processes of which are similar to those of generating or learning the dog reaction model dm2 about the shape of FIG. 9, and thus descriptions will be made focusing on different parts.

The server 5 may obtain information about a sound showing a reaction of a dog. Here, the sound showing a reaction of a dog may for example include "barking" dm61 or "whimpering" dm62 when the dog pays attention to or is interested in something and "sighing" dm71, "growling" dm72, "howling" dm73 or "yelping" dm74 when the dog is indifferent to or hostile toward something. Such sound information may be received from the display apparatus 1 or obtained from a result of searching the Internet.

The server 5 may sort and group pieces of information about the sounds according to the reactions, thereby generating the dog reaction model dm5 about the sounds. The dog reaction model dm5 may include a preference reaction model dm6 and a non-preference reaction model dm7 which are grouped according to reactions of a dog. Further, the server 5 may generate or learn reaction models cm5 for companion animals of other species along with the dog reaction model dm5, and a reaction sound model m5 that includes the dog reaction model dm5 and the reaction models cm5 for the companion animals of other species. However, without limitations, the server 5 may entirely or partially receive the reaction sound model m5 from the display apparatus 1, other servers, etc.

The server 5 may employ at least one of machine learning, a neural network or a deep-learning algorithm as a rule-based or artificial-intelligence algorithm to perform at least a part of data analysis, process, and result information generation for generating the reaction sound model m5.

Thus, the server 5 with the reaction sound model m5 determines whether the dog 21 prefers the content 33 output with the second sound quality value, based on matching between the acoustic characteristics b1 received from the display apparatus 1 and either of the preference reaction model dm6 or the non-preference reaction model dm7 of the dog reaction model dm5.

For example, when the dog 21 makes a sound of "sighing", the characteristics b1 matches one model dm71 of the non-preference reaction models dm7, and therefore the server 5 determines that the dog 21 does not prefer the content 33 output with the second sound quality value, and selects the third sound quality value different from the second sound quality value. Further, the server 5 may transmit the determined third sound quality value to the display apparatus 1.

FIG. 11 illustrates an example of determining image quality value at operations S44 and S47 of FIG. 8. Below, descriptions will be made by way of example on the assumption that the dog-dedicated content 33 is displayed, but the disclosure is not limited to this example.

In the operation S44 of FIG. 8, the server 5 may determine the second image quality value corresponding to the dog identified based on the object information received from the display apparatus 1. Here, the second image quality value may be based on a standard table 61 where standard image quality values are tabulated based on the visual characteristics of the identified dog, and the standard image quality value may include a standard frequency F, a standard color C, a standard brightness L, or a standard sharpness S, etc. For example, when a certain dog 21 is identified, the second image quality value may be determined at a standard frequency F2 of 75 Hz, and the display apparatus 1 may display the content 33 with the second image quality value having the standard frequency F2 of 75 Hz.

Further, in the operation S47 of FIG. 8, the server 5 may determine the third image quality value corresponding to the preference of the dog 21 determined based on the reaction information. Here, the third image quality value may be based on a correction table 62 where correction image quality values are tabulated by correcting the standard image quality values according to the reactions of the dog 21, and the correction image quality value may include a correction frequency F21, a correction color C21, a correction brightness L21, a correction sharpness S21, etc.

For example, regarding the non-preference reaction of the dog 21 to the content 33 having the standard frequency F2 of 75 Hz, the third image quality value may be determined to have the correction frequency F21 of 78 Hz by correcting the standard frequency F2 of 75 Hz as much as a predetermined value, and the display apparatus 1 may display the content 33 with the third image quality value having the correction frequency F21 of 78 Hz.

Figure 12:
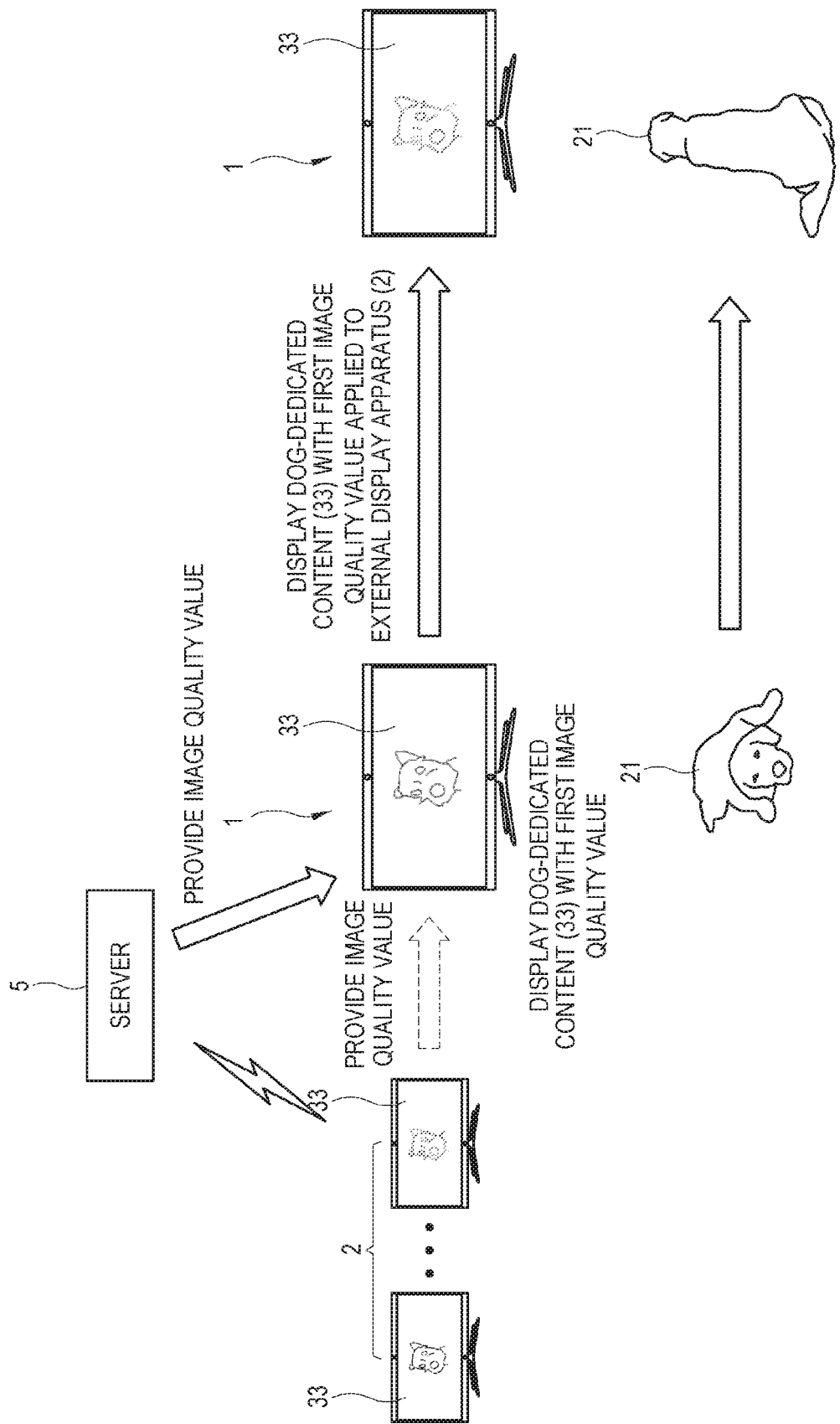
FIG. 12 illustrates another example of receiving an image quality value at operation S44 of FIG. 4.

However, the standard table 61 or the correction table 62 is merely an example of information about the image quality value, and therefore the image quality value may be determined based on unrestricted data corresponding to the object information or reaction information of the dog 21. To generate the image quality value or the information about the image quality value, the server 5 may employ at least one of machine learning, a neural network or a deep-learning algorithm as a rule-based or artificial-intelligence algorithm to perform at least a part of data analysis, process, and result information generation FIG. 12 illustrates another example of receiving the image quality value in the operation S44 of FIG. 4. In the operation S44 of FIG. 4, the display apparatus 1 receives the image quality value based on the object information. Alternatively, the display apparatus 1 in this embodiment may receive the image quality value based on at least one external display apparatus 2.

Specifically, as shown in FIG. 12, it will be assumed that the same content 33 is broadcasted through the display apparatus 1 in this embodiment and at least one external display apparatus 2, and the at least one external display apparatus 2 displays the content 33 with each individual predetermined image quality value.

In this case, the display apparatus 1 may receive the image quality value corresponding to the at least one external display apparatus 2, i.e. the image quality value with which the at least one external display apparatus 2 displays the content 33. For example, the display apparatus 1 may receive the image quality value that has been applied to the at least one external display apparatus 2, or may receive the image quality value that is being currently applied to the at least one external display apparatus 2.

As an example where the display apparatus 1 receives the image quality value that is being currently applied to the at least one external display apparatus 2, when the number of external display apparatuses using an image quality value of A of the at least one external display apparatus 2 is greater than the number of the other external display apparatuses using an image quality value of B, the display apparatus 1 may receive the image quality value of A. However, the disclosure is not limited to this example, and the display apparatus 1 may receive an image quality value of a specific external display apparatus.

Alternatively, when the number of external display apparatuses using an image quality value of A of the at least one external display apparatus 2, the target viewer of which is a dog corresponding to the dog 21 of the display apparatus 1, is greater than the number of the other external display apparatuses using an image quality value of B, the display apparatus 1 may receive the image quality value of A.

Meanwhile, the image quality value corresponding to the at least one external display apparatus 2 to be received in the display apparatus 1 is not limited to that determined by the server 5 and received from the server 5, but may be determined by the display apparatus 1 or the at least one external display apparatus 2 or may be directly received from the at least one external display apparatus 2.

Figure 13:
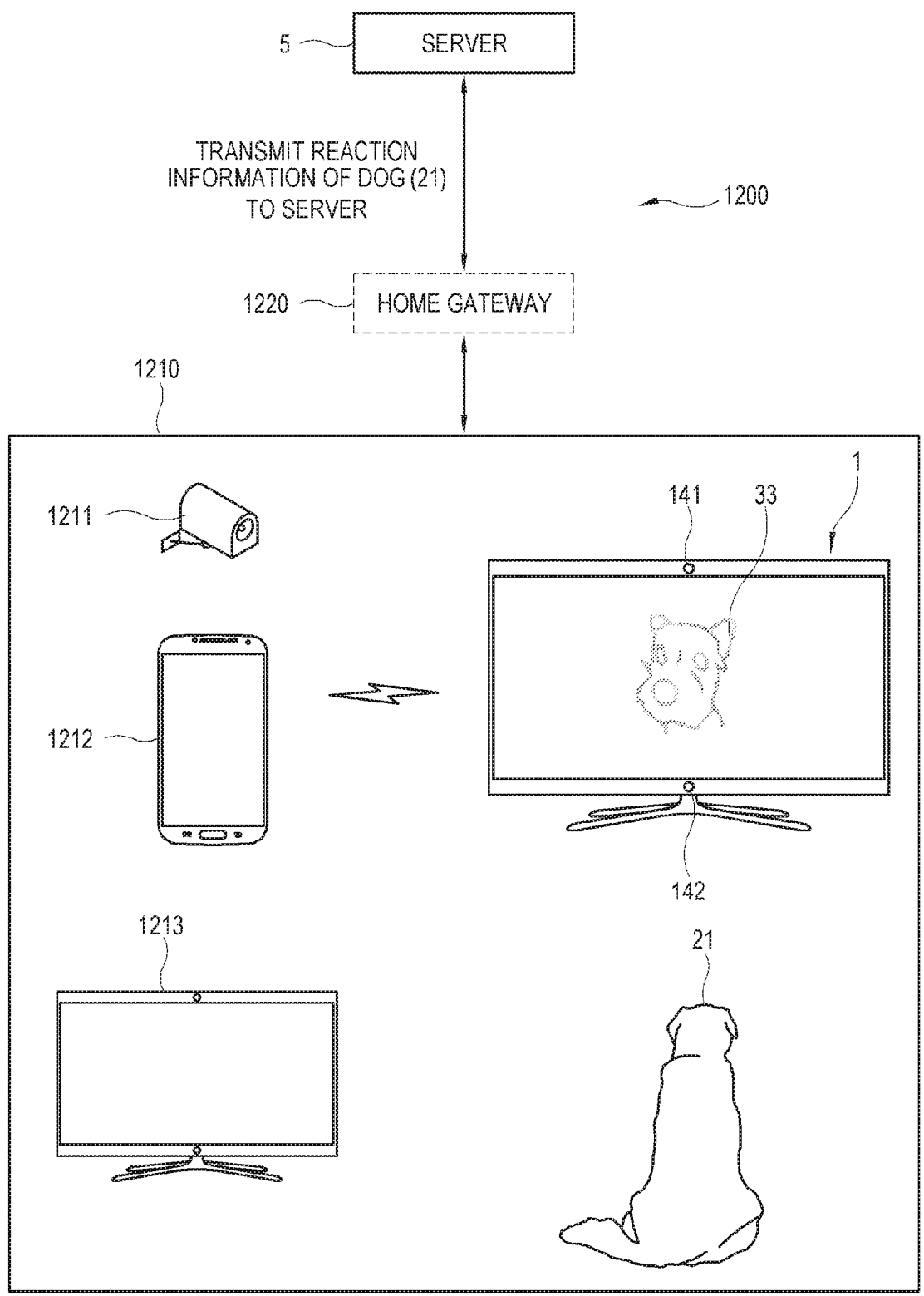
FIG. 13 illustrates an example of providing object information at operation S43 or reaction information at operation S46 in FIG. 8 to a server.

FIG. 13 illustrates an example of providing object information at operation S43 or reaction information at operation S46 in FIG. 8 to a server. A home network system 1200 according to an embodiment illustrated in FIG. 13 may include a plurality of home devices 1210 having control and communication functions, and may further include a home gateway 1220 as necessary. The home devices 1210 may be placed inside and outside a house, and may include the display apparatus 1 of FIG. 2, an unmanned surveillance camera 1211, a smart phone 1212, another display apparatus 1213, etc. However, there are no limits to the kinds of home devices 1210.

The home devices 1210 may communicate with each other through various communication standards, communicate with the server 5, and may communicate with the server 5 via the home gateway 1220. Through such communication, the home devices 1210 may provide information about a companion animal to the server 5.

For example, in a case of displaying the dog-dedicated content 33, the home devices 1210 may obtain object information about a dog 21 while the display apparatus 1 displays the content 33 to which a predetermined first image quality value is applied corresponding to the dog, or may obtain reaction information about the dog 21 while the content is displayed with a second image quality value corresponding to identification of the dog 21, thereby transmitting the obtained information to the server 5. For example, the unmanned surveillance camera 1211 may obtain at least one of image information or sound information about the dog 21 while the content 33 is displayed, and provide the obtained information to the server 5.

The server 5 may determine the second image quality value by identifying the dog 21 based on the information received from each home device 1210, or determine the third image quality value by determining the preference of the dog 21.

FIG. 14 illustrates an example of changing content at operation S45 or S48 of FIG. 8. Below, descriptions will be made on the assumption that the dog-dedicated content 33 is displayed by way of example, but the disclosure is not limited to this example.

The processor 18 of the display apparatus 1 may perform control to display the first content 33 with the first image quality value, and obtain the object information about the dog 21 while the first content 33 is displayed with the first image quality value.

The display apparatus 1 may use the first image quality value to display second content 36 which corresponds to the dog 21 identified based on the object information. When the display apparatus 1 receives the second image quality value corresponding to the dog 21 identified based on the object information, the display apparatus 1 may use the second image quality value to display the second content 36.

Further, the display apparatus 1 may receive and display third content based on the preference of the dog 21 for the second content 36, and, even in this case, receive the third image quality value based on the preference of the dog 21 for the second content 36.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a ROM or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Therefore, according to the disclosure, there are provided a display apparatus and a control method thereof, in which content is provided in image quality mirroring visual characteristics or sound quality mirroring auditory characteristics of a companion animal, and content is provided in image or sound quality based on reactions of the companion animal to the content, thereby making the companion animal pay attention to the content.

Although the disclosure and merits have been described with reference to the specific embodiments and drawings, the disclosure and scope of the right are not limited thereto. It will be appreciated by those skilled in the art that various changes may be made in the embodiments without departing from the principles and spirit of the disclosure, the scope of which is defined in the appended claims and their equivalents. It will be understood that the detailed descriptions and drawings in the disclosure are merely an example for description, and various alternative embodiments are also included in the extent of the disclosure.

What is claimed is:

1. A display apparatus comprising:
a display;
a memory configured to store one or more instructions;
a communication interface configured to communicate with a server; and
a processor configured to execute the one or more instructions to:
control the display to display content based on a first image quality value,
transmit information about a companion animal to the server,
receive, from the server, a second image quality value based on the information about the companion animal, and
control the display to change an image quality of the displayed content based on the received second image quality value,
wherein the information is obtained while the content is displayed based on the first image quality value,
wherein the second image quality value is different from the first image quality value, and
wherein the second image quality value has a first value when the companion animal is identified as a first type of species, and the second image quality value has a second value when the companion animal is identified as a second type of species, the first and the second values being based on the visual perception characteristics unique to each of the first and second types of species.

2. The display apparatus according to claim 1, further comprising
a video camera configured to obtain an image captured in a frontward direction of the display, and
the processor is further configured to obtain the information about the companion animal based on a shape of an object present within the image obtained by the video camera while the content is displayed with the first image quality value.

3. The display apparatus according to claim 2, wherein the video camera comprises an audio receiver configured to obtain a sound, and
the processor is further configured to obtain the information about the companion animal based on the sound obtained by the audio receiver while the content is displayed with the first image quality value.

4. The display apparatus according to claim 2, wherein the processor is further configured to transmit reaction information of the companion animal obtained by the video camera to the server while the content is displayed with the second image quality value, receive a third image quality value determined based on the reaction information from the server, and control the display to change the image quality of the displayed content based on the received third image quality value.

5. The display apparatus according to claim 4, wherein the reaction information is used to determine preference of the companion animal for the content, and the third image quality value is determined based on the determined preference of the companion animal for the content.

6. The display apparatus according to claim 4, wherein the third image quality value is determined based on preference of the companion animal for the content,
wherein the preference of the companion animal for the content is determined based on a model about a reaction of the companion animal, and
wherein the model about the reaction of the companion animal is previously learned using an artificial-intelligence algorithm and stored in storage.

7. The display apparatus according to claim 5, wherein the preference of the companion animal for the content is determined based on past history information about a reaction of the companion animal.

8. The display apparatus according to claim 5, wherein the preference of the companion animal for the content is determined based on information about a reaction of the companion animal received from an external apparatus.

9. The display apparatus according to claim 1, further comprising an audio output unit configured to output a sound, and
the processor is further configured to output the content with a first sound quality value through the audio output unit, receive a second sound quality value corresponding to the companion animal identified based on the information from the server, and output the content based on the received second sound quality value through the audio output unit.

10. The display apparatus according to claim 1, wherein the processor is further configured to receive, from the server, the second image quality value corresponding to the companion animal identified based on a model corresponding to the companion animal, and
wherein the model corresponding to the companion animal is previously learned using an artificial-intelligence algorithm and stored in the server.

11. The display apparatus according to claim 1, wherein the first image quality value and the second image quality value comprise at least one of a frequency, color, brightness or sharpness.

12. A control method of a display apparatus having a display, the control method comprising:
displaying content based on a first image quality value on the display;
transmitting information about a companion animal to a server;
receiving, from the server, a second image quality value based on the information about the companion animal; and
changing an image quality of the displayed content based on the second image quality value on the display,
wherein the second image quality value is different from the first image quality value, and
wherein the second image quality value has a first value when the companion animal is identified as a first type of species, and the second image quality value has a second value when the companion animal is identified as a second type of species, the first and the second values being based on the visual perception characteristics unique to each of the first and second types of species.

13. The control method according to claim 12, further comprising obtaining the information about the companion animal while the content is displayed based on the first image quality value,
wherein the obtaining of the information comprises obtaining the information about the companion animal based on a shape of an object present within an image obtained while the content is displayed with the first image quality value.

14. The control method according to claim 13, wherein the obtaining of the information comprises obtaining the information about the companion animal based on a sound obtained while the content is displayed with the first image quality value.

15. The control method according to claim 12, further comprising:
outputting the content with a first sound quality value through an audio output unit;
receiving a second sound quality value corresponding to the companion animal identified based on the information from the server; and
outputting the content based on the received second sound quality value through the audio output unit.

16. The control method according to claim 12, wherein the receiving of the second image quality value comprises:
receiving, from the server, the second image quality value corresponding to the companion animal identified based on a model corresponding the companion animal,
wherein the model corresponding to the companion animal is previously learned using an artificial-intelligence algorithm and stored in the server.

17. The control method according to claim 12, further comprising:
transmitting reaction information of the companion animal, which is obtained while the content is displayed with the second image quality value, to the server;
receiving a third image quality value determined based on the reaction information from the server, and
displaying the content with the third image quality value on the display.

18. The control method according to claim 17, wherein the third image quality value is determined based on preference of the companion animal for the content, which is determined based on the reaction information.

19. The control method according to claim 17, wherein the displaying of the content with the third image quality value on the display comprises receiving, from the server, the third image quality value determined based on preference of the companion animal for the content,
wherein the preference of the companion animal for the content is determined based on a model about a reaction of the companion animal, and
wherein the model about the reaction of the companion animal is previously learned using an artificial-intelligence algorithm and stored in storage.

20. A non-transitory recording medium, in which a computer program comprising a code for performing a control method of a display apparatus having a display as a computer-readable code is stored, the control method comprising:
displaying content based on a first image quality value on the display;
transmitting information about a companion animal to a server;
receiving, from the server, a second image quality value based on the information about the companion animal; and
changing an image quality of the displayed content based on the second image quality value on the display,
wherein the second image quality value is different from the first image quality value, and
wherein the second image quality value has a first value when the companion animal is identified as a first type of species, and the second image quality value has a second value when the companion animal is identified as a second type of species, the first and the second values being based on the visual perception characteristics unique to each of the first and second types of species.

21. A display apparatus comprising:
a display;
a memory configured to store one or more instructions;
a communication interface configured to communicate with a server; and
a processor configured to execute the one or more instructions to:
control the display to display first content based on a first image quality value, transmit information about an object to the server,
receive, from the server, second content dedicated to the object and a second image quality value based on the information about the object, and
control the display to change an image quality of the displayed content based on the received second image quality value,
wherein the information is obtained while the first content is displayed based on the first image quality value,
wherein the second image quality value is different from the first image quality value, and
wherein the second image quality value has a first value when the object is identified as a first type of species, and the second image quality value has a second value when the object is identified as a second type of species, the first and the second values being based on the visual perception characteristics unique to each of the first and second types of species.

* * * * *